Jan. 5, 1926.  1,568,835
J. B. HAWLEY, JR
INTERNAL COMBUSTION ENGINE
Filed March 13, 1924   3 Sheets-Sheet 1
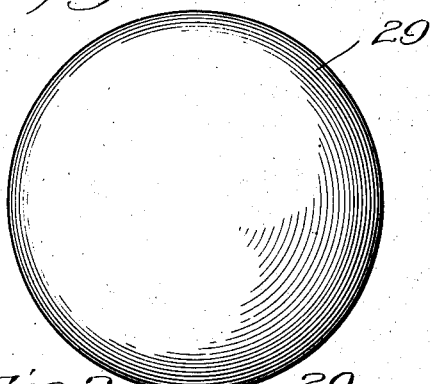
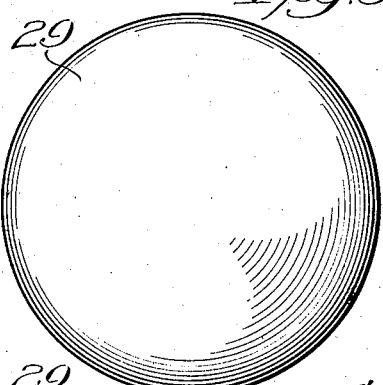
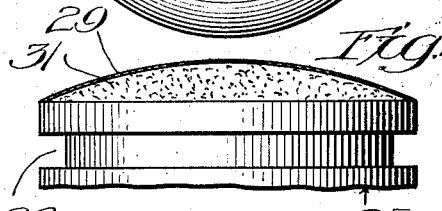
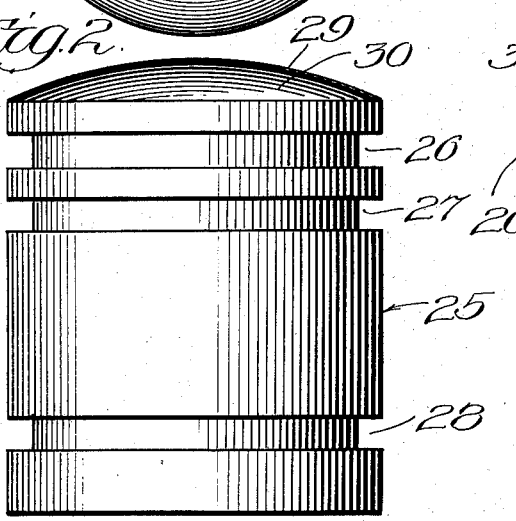
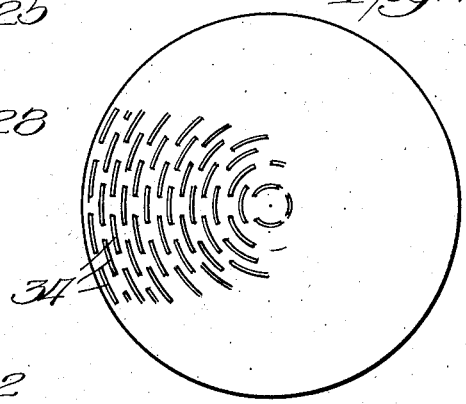
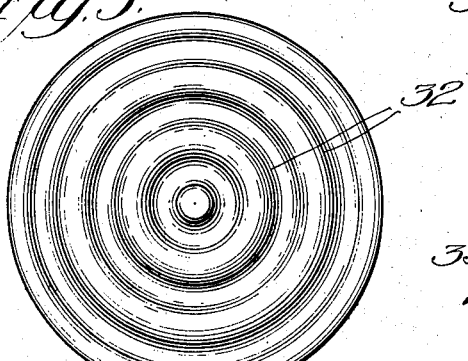
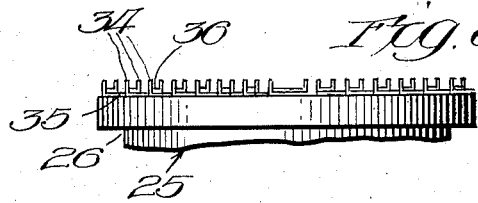
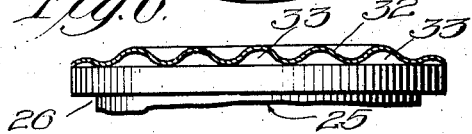
Inventor:
John B. Hawley, Jr.

Jan. 5, 1926.                                          1,568,835
J. B. HAWLEY, JR
INTERNAL COMBUSTION ENGINE
Filed March 13, 1924          3 Sheets-Sheet 2
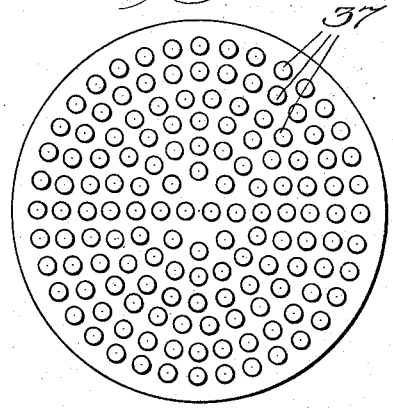
Fig. 9
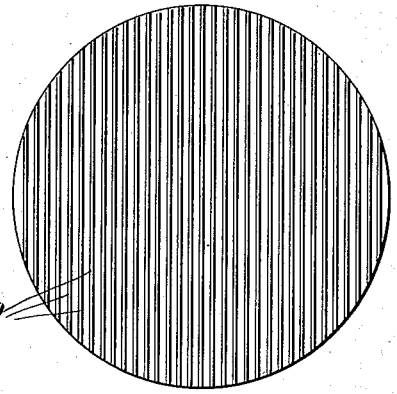
Fig. 13
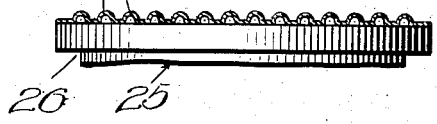
Fig. 10
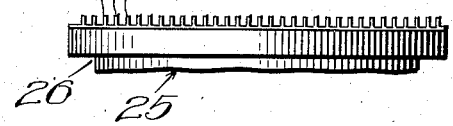
Fig. 14
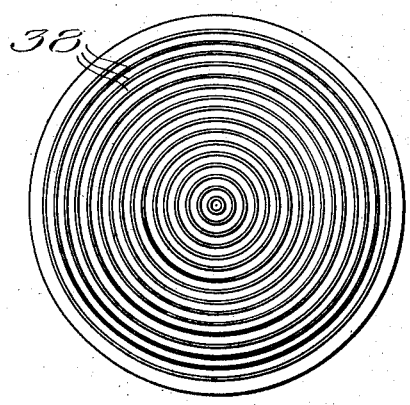
Fig. 11
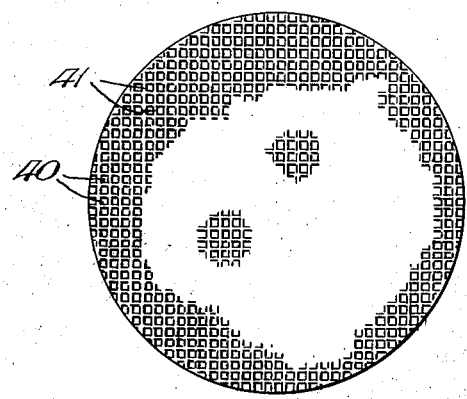
Fig. 15
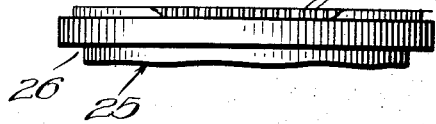
Fig. 12
Fig. 16
Inventor:
John B. Hawley, Jr.

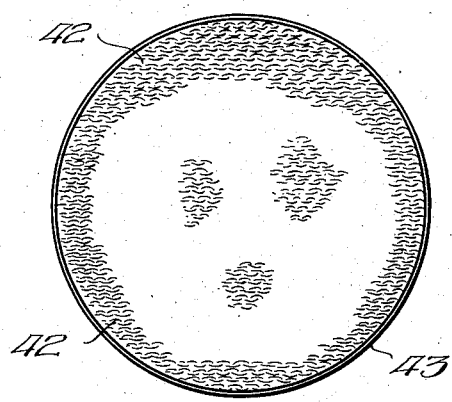
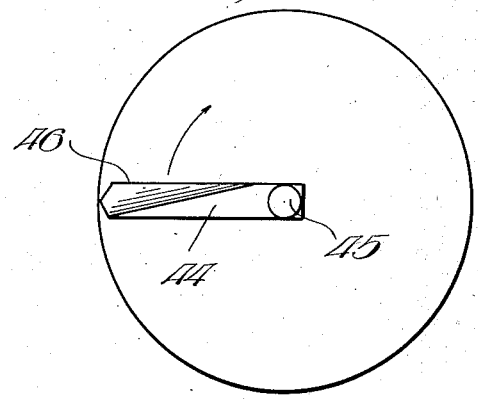
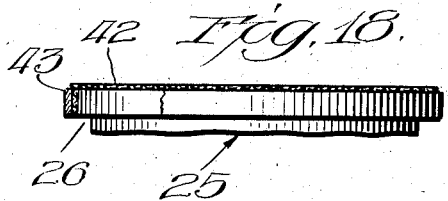
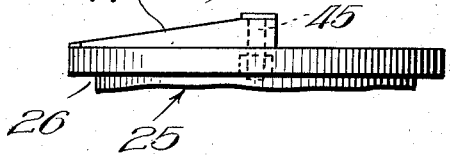
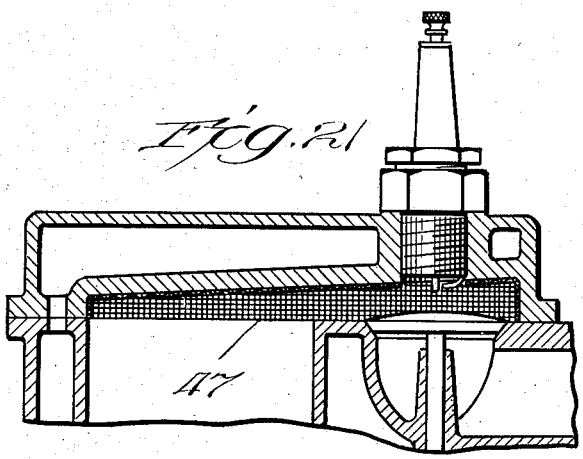

Patented Jan. 5, 1926.

1,568,835

UNITED STATES PATENT OFFICE.

JOHN B. HAWLEY, JR., OF FORT WORTH, TEXAS.

INTERNAL-COMBUSTION ENGINE.

Application filed March 13, 1924. Serial No. 698,886.

*To all whom it may concern:*

Be it known that I, JOHN B. HAWLEY, Jr., a citizen of the United States, residing at Fort Worth, in the county of Tarrant and State of Texas, have invented certain new and useful Improvements in Internal-Combustion Engines, of which the following is a specification.

This invention has to do with improvements in internal combustion engines. It has reference particularly to improvements for the purpose of eliminating or reducing carbon deposition on the surfaces and walls of the combustion chamber.

According to the present invention, I contemplate lining the surfaces of the combustion chamber with a thin metal lining made preferably of some highly conductive material and so arranged as to attain the high temperature of the explosion and yet at the same time cool on the intake charge so as not to cause pre-ignition. I also contemplate pressing these thin metal surfaces into a form which will allow, besides the temperature effect, a mechanical or scraping action.

Still more particularly I contemplate forming the exposed surface, such as the top surface of the piston itself, with ridges or fins or points which are of highly conductive material and relatively thin, so that they quickly heat and cool with the explosions and scavaging of the cylinder.

Still more particularly I contemplate as being within the scope of my invention the provision of projections or the like by machining operations performed on the surface of the piston or other part, or by welding or brazing the ridges or points to the metal of the piston or other portion of the combustion chamber; or by the use of thin metal sheets pressed into fins or other projections of the desired shape and affixed to the surfaces under consideration; or the use of chain mesh or wire screen affixed thereto; or the use of movable or hinged sheets or small pieces of thin metal so hinged as to oscillate back and forth upon each other, as well as many other forms and arrangements not specifically mentioned.

In the drawings:

Figures 1 and 2 show respectively a plan and side elevation of a piston having applied thereto one embodiment of the present invention, the top portion of the piston being shown in vertical section;

Figs. 3 and 4 show views similar to Figs. 1 and 2, but with respect to a modified form of construction;

Figs. 5 and 6 show another modified form of construction;

Figs. 7 and 8 show still another modified form of construction;

Figs. 9 and 10, 11 and 12, 13 and 14, 15 and 16, 17 and 18 show other modified forms of construction, respectively;

Figs. 19 and 20 show still another modified form of construction; and

Fig. 21 shows still another modified form of construction.

Referring first to Figs. 1 and 2, the piston is provided with the annular grooves 26, 27 and 28 for the piston rings in the usual manner.

In the particular construction of Figs. 1 and 2, I provide a thin metal projecting cover 29 over the top surface of the piston, said cover being preferably made of highly conductive relatively thin sheet metal. As a result the temperature of this surface is it able to respond to the instantaneous temperature changes within the combustion chamber much more readily and effectively than would be the case if this surface 29 were to be in contact with the piston head throughout its entire area. There is a dead air space 30 between the top surface of the piston itself and the sheet metal covering 29, and this sheet metal covering is only in actual contact with the piston around its edge. Consequently, there is only a very small area of contact for the transmission of heat by conduction. The dead air space 30 acts as an efficient heat insulator to keep the piston itself and the thin sheet metal covering suitably isolated, so that said sheet metal covering is enabled to more instantly follow the temperature changes due to the gases in the combustion chamber.

The modified construction of Figs. 3 and 4 is similar to that already explained with the exception that a filling of substantially heat insulating material 31 is placed within the space 30 already referred to. This heat insulating material 31 should, of course, be non-flammable and capable of resisting extremely high temperatures without damage.

In the modified construction of Figs. 5 and 6, the thin sheet metal plate is provided with a series of annular ribs 32 establishing dead air spaces 33. In this case the thin sheet metal covering is effectively reinforced and at the same time the benefit of the presence of the dead air spaces is also secured.

In the construction of Figs. 7 and 8, I provide a series of relatively thin disconnected fins or ridges 34 which reach upwardly from the top surface of the piston, said fins being established as upset portions from plates 35 and 36. The plate 35 is first set into place on the cylinder head, and then the plate 36 is set into place on top of the plate 35. When this is done, the fins projecting upwards from the lower plate reach through the openings of the upper plate which were established by the act of forming the fins therein.

In the construction of Figs. 9 and 10 the thin plate is provided with a series of knobs or upstanding buttons 37 scattered over its surface, the same being separated from the surface of the piston by the dead air spaces thus created.

In the construction of Figs. 11 and 12, the top surface of the piston itself is provided with a series of annular ring projections or fins 38, the same being formed by machining into the surface of the piston. The construction of Figs. 13 and 14 is similar thereto except that in this case the fins 39 are formed straight across the piston head in a given direction.

The construction of Figs. 15 and 16 is provided with transverse channels 40 machined in directions at right angles to each other and establishing between them a series of upstanding points or lugs 41.

In the construction of Figs. 17 and 18 one or more layers of metal fabric or chain mesh 42 are secured to the top surface of the piston in any convenient manner, as by means of spot welding or by the use of a ring 43 shrunk in place around the periphery of the piston head, the chain mesh being thus clinched in place.

In the construction of Figs. 19 and 20, a blade 44 is pivoted to the top of the piston by a pin 45, said blade being provided with a cutting edge 46 on its approaching side so as to continuously remove carbon by a cutting or scraping action. The blade is rotated in any convenient manner, as by the action of the exhaust gases.

In the construction of Fig. 21 the stationary surfaces of the combustion chamber are provided with projections, in this case by the use of chain mesh 47 placed over the surface of the combustion chamber and held in place in any convenient manner, as by the use of spot welding.

While I have herein shown and described only certain embodiments of the features of my present invention, still I do not intend to limit myself to the same, except as I may do so in the claims.

I claim:

1. The combination with the piston of an internal combustion engine, of a series of relatively thin metal plates of substantially uniform thickness suitably formed to present a plurality of projections extending from their body portions substantially at right angles, and means attaching said body portions to the piston head, whereby there are established a plurality of projections of substantially uniform thinness reaching outwardly from the piston head substantially at right angles, and separated from each other by grooves of substantially equal thickness, and whereby the heating and cooling of said projections is of substantially equal rate at all points throughout the projecting portions, substantially as described.

2. The combination with the piston head of an internal combustion engine, of a series of relatively thin projections reaching outwardly therefrom substantially at right angles, said projections being of substantially uniform thinness at all points, and separated by grooves of substantially uniform thickness, whereby the heating and cooling of said projections is at substantially uniform rate throughout their projecting portions, substantially as described.

JOHN B. HAWLEY, Jr.